No. 792,186. PATENTED JUNE 13, 1905.
A. M. ZIMMERMAN.
CORN AND COB CRUSHER AND GRINDER.
APPLICATION FILED OCT. 21, 1902.
2 SHEETS—SHEET 1.
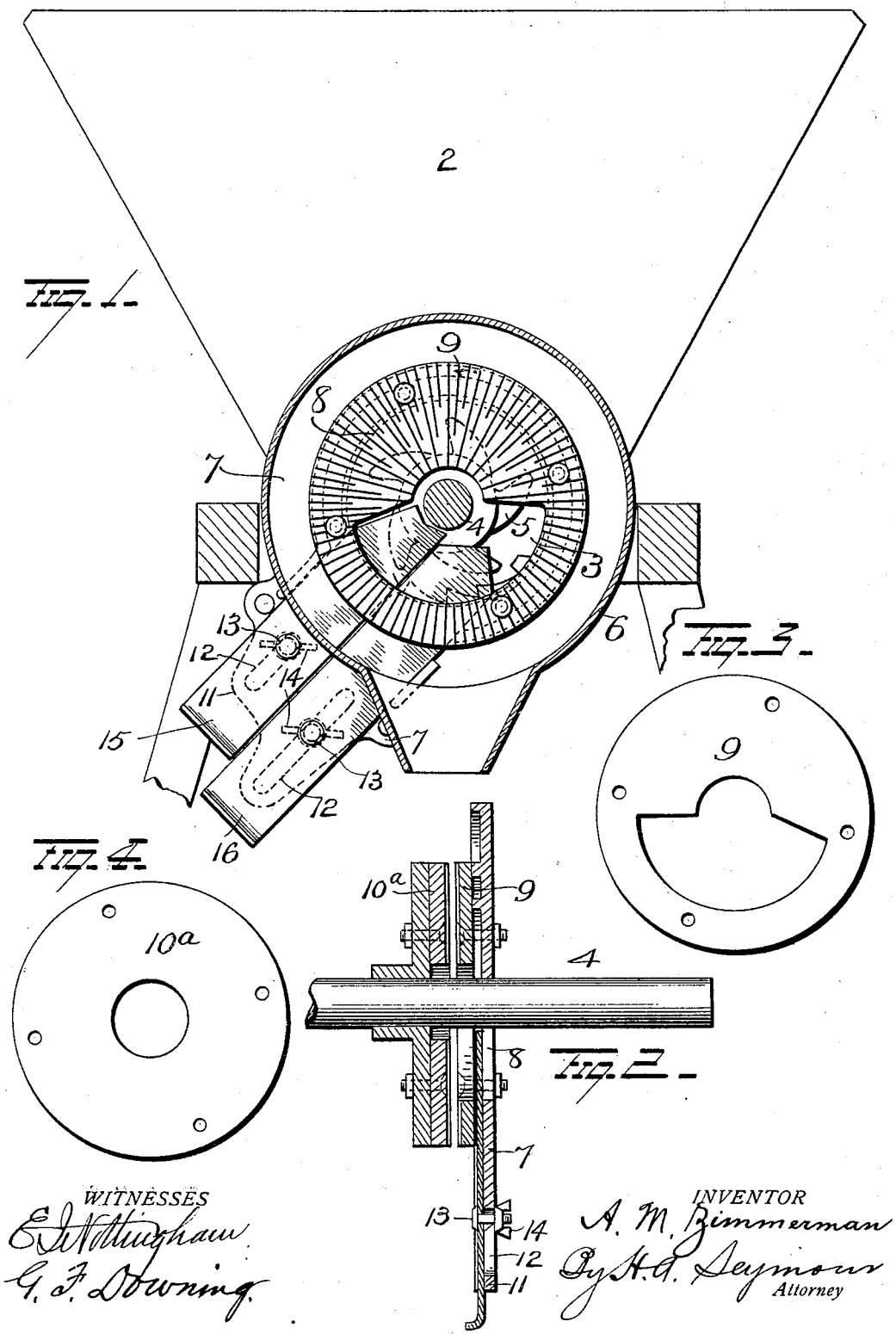

No. 792,186. PATENTED JUNE 13, 1905.
A. M. ZIMMERMAN.
CORN AND COB CRUSHER AND GRINDER.
APPLICATION FILED OCT. 21, 1902.
2 SHEETS—SHEET 2.
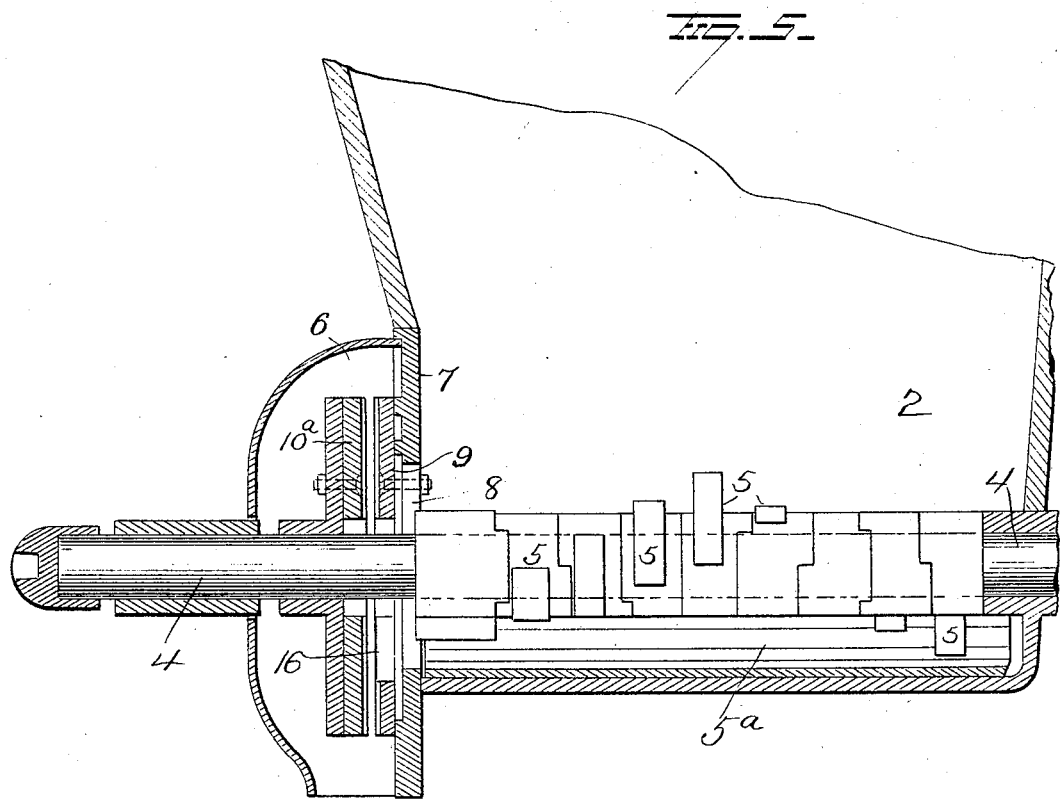

No. 792,186.

Patented June 13, 1905.

UNITED STATES PATENT OFFICE.

ABRAHAM M. ZIMMERMAN, OF NEW HOLLAND, PENNSYLVANIA.

CORN AND COB CRUSHER AND GRINDER.

SPECIFICATION forming part of Letters Patent No. 792,186, dated June 13, 1905.

Application filed October 21, 1902. Serial No. 128,176.

*To all whom it may concern:*

Be it known that I, ABRAHAM M. ZIMMERMAN, a resident of New Holland, in the county of Lancaster and State of Pennsylvania, have invented certain new and useful Improvements in Corn and Cob Crushers and Grinders; and I do hereby declare the following to be a full, clear, and exact description of the invention, such as will enable others skilled in the art to which it appertains to make and use the same.

My invention relates to an improvement in corn and cob crushers and grinders, and more particularly to improved means for regulating the feed of such machines, the object of the invention being to provide improvements of this character in which the size and shape of the feed-opening can be regulated at will to give the best results and provide feed-regulating means which will be extremely simple in construction, easy to operate, and cheap to manufacture.

With these objects in view the invention consists in certain novel features of construction and combinations and arrangements of parts, as will be more fully hereinafter described, and pointed out in the claims.

In the accompanying drawings, Figure 1 is a view in section illustrating my improvements. Fig. 2 is a partial sectional view taken at right angles to Fig. 1 and omitting parts 3, 5, and 6; and Figs. 3 and 4 are views of the grinding-plates removed from the machine, the "dress" on the plates not being shown. Fig. 5 is a longitudinal sectional view of the machine.

1 represents a supporting-frame, on which a hopper 2 is mounted and directs the corn and cobs into a horizontal cylindrical crushing-receptacle 3, through which a shaft 4 projects longitudinally and carries crushing-fingers 5, which coöperate with a concave $5^a$ to crush the cobs and corn. Communicating with one end of the crushing-cylinder is a grinding-chamber 6, into which the crushed cobs and corn are fed, as will more fully hereinafter appear. In the grinding-chamber at one side a guide-plate 7 is located and is provided with a large opening 8 for the passage of the crushed material. The opening 8, however, is partially closed by a stationary vertical grinding-disk 9, having an opening for shaft 4 and a segmental opening or feed-passage 10 around the lower half of the shaft. A grinding-disk $10^a$ is secured on the shaft to coöperate with the stationary disk and grind the material between them, and a suitable outlet-spout $6^a$ is provided on chamber 6, through which the ground material escapes.

Plate 7 is provided with a recessed extension 11, having elongated slots 12 therein for the reception of bolts 13 and thumb-nuts 14 to secure slides 15 and 16, respectively, at any position desired. The upper slide, 15, is adapted when moved to its closing position to abut against the shaft 4 and close the upper portion of the feed-passage 10, while the lower slide, 16, closes the lower larger portion of said opening or feed-passage.

It will thus be seen that by employing two slides one or both of them can be adjusted not only to regulate the size of the feed-passage, but also the shape thereof. For instance, lower slide 16 when alone moved will give a feed-passage entirely below the shaft, and thus permit a comparatively rapid feed, while if the upper slide 15 is alone moved the feed will be slower, and if both are moved the most rapid feed will be given the machine.

The adjustment of the slides can be readily accomplished by loosening thumb-nuts 14, moving the slides, and clamping them in position by the nuts.

A great many changes might be made in the general form and arrangement of the parts described without departing from my invention, and hence I do not confine myself to the precise construction set forth, but consider myself at liberty to make such slight changes and alterations as fairly fall within the spirit and scope of my invention.

Having fully described my invention, what I claim as new, and desire to secure by Letters Patent, is—

1. A feed mechanism for mills, comprising a plate having a feed-opening therein and provided with an extension, a stationary grinding-disk having a segmental feed-opening therein below the axis thereof, said disk secured to said plate, a slide located between the stationary grinding-disk and plate and adapted to be made to extend across the segmental opening in the disk and means for securing the slide to the extension on the plate in any desired adjustment to regulate the amount of material passing through said feed-opening in the disk.

2. A feed mechanism for mills, comprising a plate having a segmental feed-opening therein below its axis and provided with an extension, a stationary grinding-disk secured to said plate, two diagonal slides disposed side by side and located between the stationary disk and plates and adapted to be made to extend across said segmental feed-opening, and means for independently securing slides to the extension on the fixed plate in any desired adjustment for regulating the size and shape of the segmental feed-opening.

In testimony whereof I have signed this specification in the presence of two subscribing witnesses.

ABRAHAM M. ZIMMERMAN.

Witnesses:
    DAVID M. WENGER,
    MILTON WENGER.